US007885805B2

(12) United States Patent
Dickens et al.

(10) Patent No.: US 7,885,805 B2
(45) Date of Patent: Feb. 8, 2011

(54) APPARATUS, SYSTEM, AND METHOD FOR SIMULATING MULTIPLE HOSTS

(75) Inventors: Louie A. Dickens, Tucson, AZ (US);
Timothy A. Johnson, Tucson, AZ (US);
William W. Owen, Tucson, AZ (US);
Corinna J. Sheret, Sahuarita, AZ (US);
Robert L. Valdez, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 11/854,317

(22) Filed: Sep. 12, 2007

(65) Prior Publication Data

US 2009/0070092 A1    Mar. 12, 2009

(51) Int. Cl.
*G06F 9/455* (2006.01)
(52) U.S. Cl. .................. 703/24; 703/21; 709/223; 709/231
(58) Field of Classification Search .............. 703/21, 703/24, 2; 711/1, 162, 163; 370/431; 709/212, 709/223, 220, 231; 717/120
See application file for complete search history.

(56) References Cited

U.S. PATENT DOCUMENTS

| | | | | |
|---|---|---|---|---|
| 5,331,628 A | 7/1994 | Cheng et al. | ................... | 370/14 |
| 5,832,204 A | 11/1998 | Apperley et al. | ........ | 395/183.18 |
| 5,838,919 A | 11/1998 | Schwaller et al. | ....... | 395/200.54 |
| 5,996,034 A | 11/1999 | Carter | ......................... | 710/100 |
| 6,434,499 B1 | 8/2002 | Ulrich et al. | ................. | 702/115 |
| 6,522,995 B1 | 2/2003 | Conti et al. | .................. | 702/186 |
| 6,754,853 B1 | 6/2004 | DeKoning et al. | ............ | 714/42 |
| 6,983,083 B2 | 1/2006 | Fedorovskaya et al. | ..... | 382/286 |
| 7,124,324 B1 | 10/2006 | Au | ................................ | 714/29 |
| 7,240,098 B1 * | 7/2007 | Mansee | ....................... | 709/212 |
| 7,315,807 B1 * | 1/2008 | Lavallee et al. | ............... | 703/21 |
| 7,478,018 B1 * | 1/2009 | Lavallee et al. | ................ | 703/2 |
| 7,577,729 B1 * | 8/2009 | Umbehocker et al. | ........ | 709/223 |
| 2005/0080982 A1 * | 4/2005 | Vasilevsky et al. | ............. | 711/1 |
| 2005/0120160 A1 * | 6/2005 | Plouffe et al. | ................... | 711/1 |
| 2005/0223183 A1 * | 10/2005 | Pherson et al. | .............. | 711/163 |
| 2007/0067481 A1 * | 3/2007 | Sharma et al. | .............. | 709/231 |
| 2007/0094466 A1 * | 4/2007 | Sharma et al. | .............. | 711/162 |
| 2007/0156877 A1 * | 7/2007 | Krishnan et al. | ............. | 709/223 |
| 2007/0168476 A1 * | 7/2007 | Davies et al. | ............... | 709/220 |
| 2007/0234292 A1 * | 10/2007 | Kumar et al. | ................ | 717/120 |
| 2008/0049779 A1 * | 2/2008 | Hopmann et al. | ........... | 370/431 |
| 2009/0019142 A1 * | 1/2009 | Dutt et al. | .................... | 709/223 |

* cited by examiner

*Primary Examiner*—Paul L Rodriguez
*Assistant Examiner*—Kandasamy Thangavelu
(74) *Attorney, Agent, or Firm*—Kunzler Needham Massey & Thorpe (57) ABSTRACT

An apparatus, system, and method are disclosed for simulating multiple hosts. An object module creates a plurality of host object instances. Each host object instance simulates a host to a storage device connection. In addition, each host object instance includes a unique identifier. A traffic generator serially establishes communications between each host object instance and a storage device using the unique identifier. The traffic generator serially establishes communications until a number of host object instances in communication with the storage device is greater than a host threshold. A verification module verifies that the storage device established communications with each host object instance according to a specified connection protocol. The verification module communicates a pass if each host object instance communication is verified.

20 Claims, 7 Drawing Sheets

APPARATUS, SYSTEM, AND METHOD FOR SIMULATING MULTIPLE HOSTS

BACKGROUND OF THE INVENTION

1. Field of the Invention

This invention relates to simulating hosts and more particularly relates to simulating multiple hosts.

2. Description of the Related Art

A storage device such as a hard disk drive, magnetic tape drive, optical storage device, micromechanical storage device, holographic storage device, and semiconductor storage device stores data for a host. The host may be a computer workstation, server, mainframe computer, and the like.

The storage device may also store data for multiple hosts. For example, some storage devices are configured to support five hundred (500) or more concurrent communication connections with hosts. Unfortunately, the large number of hosts supported by the storage device may make it difficult and expensive to test the storage device's support for the multiple hosts. For example, providing five hundred (500) hosts may be prohibitively expensive.

SUMMARY OF THE INVENTION

From the foregoing discussion, there is a need for an apparatus, system, and method that simulate multiple hosts. Beneficially, such an apparatus, system, and method would test support of a storage device for the multiple hosts.

The present invention has been developed in response to the present state of the art, and in particular, in response to the problems and needs in the art that have not yet been fully solved by currently available methods for simulating multiple hosts. Accordingly, the present invention has been developed to provide an apparatus, system, and method for simulating multiple hosts that overcome many or all of the above-discussed shortcomings in the art.

The apparatus to simulate multiple hosts is provided with a plurality of modules configured to functionally execute the steps of creating a plurality of host object instances, serially establishing communications, verifying communications, and communicating a pass. These modules in the described embodiments include an object module, a traffic generator, and a verification module.

The object module creates a plurality of host object instances. Each host object instance simulates a host to a storage device connection. In addition, each host object instance includes a unique identifier.

The traffic generator serially establishes communications between each host object instance and a storage device using the unique identifier. The traffic generator serially establishes communications until a number of host object instances in communication with the storage device is greater than a host threshold.

The verification module verifies that the storage device established communications with each host object instance according to a specified connection protocol. The verification module communicates a pass if each host object instance communication is verified.

A system of the present invention is also presented for simulating multiple hosts. In particular, the system, in one embodiment, includes a storage device, a test computer, and a traffic generator.

The storage device may store data for a host as known to those skilled in the art. The test computer comprises an object module. The object module creates a plurality of host object instances. Each host object instance simulates a host to a storage device connection of the storage device. In addition, each host object instance includes a unique identifier.

The traffic generator comprises interface hardware and semiconductor logic. The traffic generator serially establishes communications between each host object instance and the storage device using the unique identifier. The traffic generator serially establishes communications between each host object instance and the storage device until a number of host object instances in communication with the storage device are greater than a host threshold.

The test computer further comprises a verification module. The verification module verifies that the storage device established communications with each host object instance according to a specified connection protocol. The verification module communicates a pass if each host object instance communication is verified.

A method of the present invention is also presented for simulating multiple hosts. The method in the disclosed embodiments substantially includes the steps to carry out the functions presented above with respect to the operation of the described apparatus and system. In one embodiment, the method includes creating a plurality of host object instances, serially establishing communications, verifying communications, and communicating a pass. The method also may include communicating a failure report. In an embodiment, the method further includes serially removing communications and verifying that the storage device removed communications with each host object instance.

An object module creates a plurality of host object instances. Each host object instance simulates a host to a storage device connection. In addition, each host object instance includes a unique identifier.

A traffic generator serially establishes communications between each host object instance and a storage device using the unique identifier. The traffic generator serially establishes communications until a number of host object instances in communication with the storage device is greater than a host threshold.

A verification module verifies that the storage device established communications with each host object instance according to a specified connection protocol. The verification module communicates a pass if each host object instance communication is verified.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention simulates multiple hosts. Beneficially, the present invention would test support a storage device for the multiple hosts. Also, the present invention would test efficient communication between a storage device and multiple hosts. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. Modules may include hardware circuits such as one or more processors with memory, Very Large Scale Integration (VLSI) circuits, gate arrays, programmable logic, and/or discrete components. The hardware circuits may perform hardwired logic functions, execute computer readable programs stored on tangible storage devices, and/or execute programmed functions. The computer readable programs may in combination with a computer system perform the functions of the invention.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
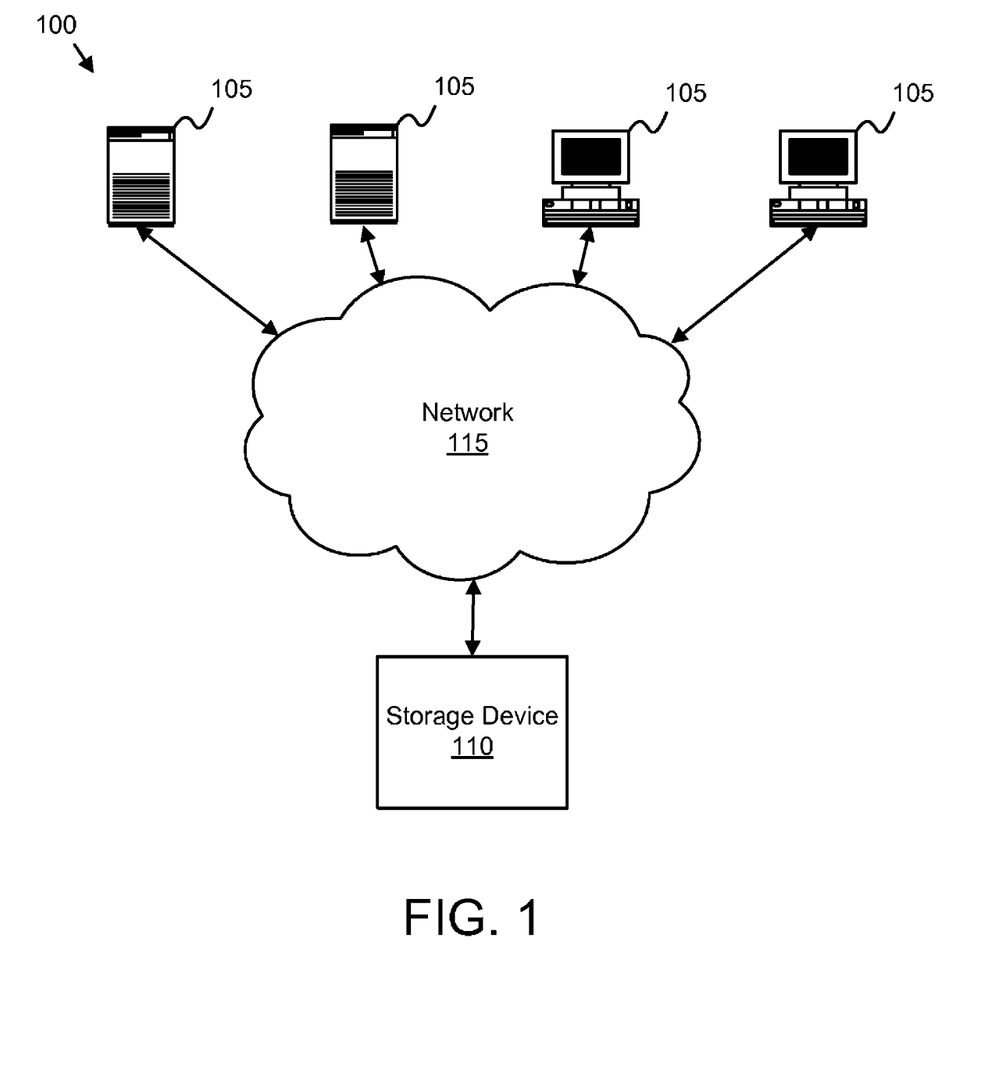
FIG. 1 is a schematic block diagram illustrating one embodiment of a system for connecting multiple hosts to a storage device via a network in accordance with the present invention.

FIG. 1 is a schematic block diagram illustrating one embodiment of a system 100 for connecting multiple hosts 105 to a storage device 110 through a network 115 in accordance with the present invention. The system 100 includes one or more hosts 105, a storage device 110, and a network 115. Although, for simplicity only four (4) hosts 105, one (1) storage device 110 and one (1) network 115 are shown, any number of hosts 105, storage devices 110 and networks 115 may be used in the system 100.

The hosts 105 may be computer workstations, servers, mainframe computers, and the like. The hosts 105 may be capable of submitting an input/output (I/O) request to the storage device 110. The hosts 105 may support a heterogeneous storage environment.

The storage device 110 may be a hard disk drive, magnetic tape drive, optical storage device, micromechanical storage device, holographic storage device, semiconductor storage device, and the like. The storage device 110 may also be configured as a just a bunch of disks (JBOD), a redundant array of independent disks (RAID), a tape library, a storage subsystem, a tape backup, a tape library, a compact disk read only memory (CD ROM) library, and the like.

The storage device 110 may store data for the plurality of the hosts 105. The storage device 110 may also support five hundred (500) or more concurrent communication connections with the hosts 105 over the network 115. Each host 105 may communicate via a unidirectional and/or a bi-directional path with the storage device 110 over the network 115 to store and/or access the data. The communication between the hosts 105 and the storage device 110 through the network 115 may be through cables or wire lines such as Ethernet cables, Fiber optic cables, and coaxial cables and/or wireless.

The network 115 connecting the hosts 105 and the storage device 110 may be selected from local area network (LAN), wide area network (WAN), Internet, Ethernet, token ring, or the like. The network 115 may comprise one or more nodes, each of which may provide one or more physical and/or logical paths for transferring the data.

The hosts 105 may link to the network 115 using a plurality of network interface cards (NICs). Each host 105 may comprise an internal bus (IB). The internal bus of each host 105 may connect to the NICs. For example, this type of connection may use Ethernet network adapter cards. The Ethernet network adapter cards may plug into the Peripheral Component Interface (PCI) bus of each host 105 and hence may link the one or more hosts 105 to a 10BASE-T or 100BASE-T LAN.

The NICs may provide the necessary physical layer connection between the hosts 105 and the serial LAN or WAN medium, as well as performing some media access control (MAC) layer functions. A computer readable program executed by the processors of the hosts 105 may typically perform Network and transport-layer protocol functions, such as Internet Protocol (IP) and Transmission Control Protocol (TCP) processing. For higher network speeds, for example, moving up to Gigabit Ethernet (GbE) and Ten Gigabit Ethernet, the NICs have may have "protocol offloading" capability, in the form of dedicated hardware processing resources to relieve the host of network layer IP processing and even transport and higher-layer functions.

The serial connection signaling rate may be of the of rate two point five gigabits per second (2.5 Gbit/s) in each direction per connection. IB may support double and quad data speeds such as five gigabits per second (5 Gbit/s) or ten gigabits per second (10 Gbit/s) respectively. A plurality of switches such as digital subscriber line (DSL) routers, Wi-Fi routers, gateways, switched fabrics, or the like may allow communication between any host of the multiple hosts 105 and the storage device 110.

Figure 2A:
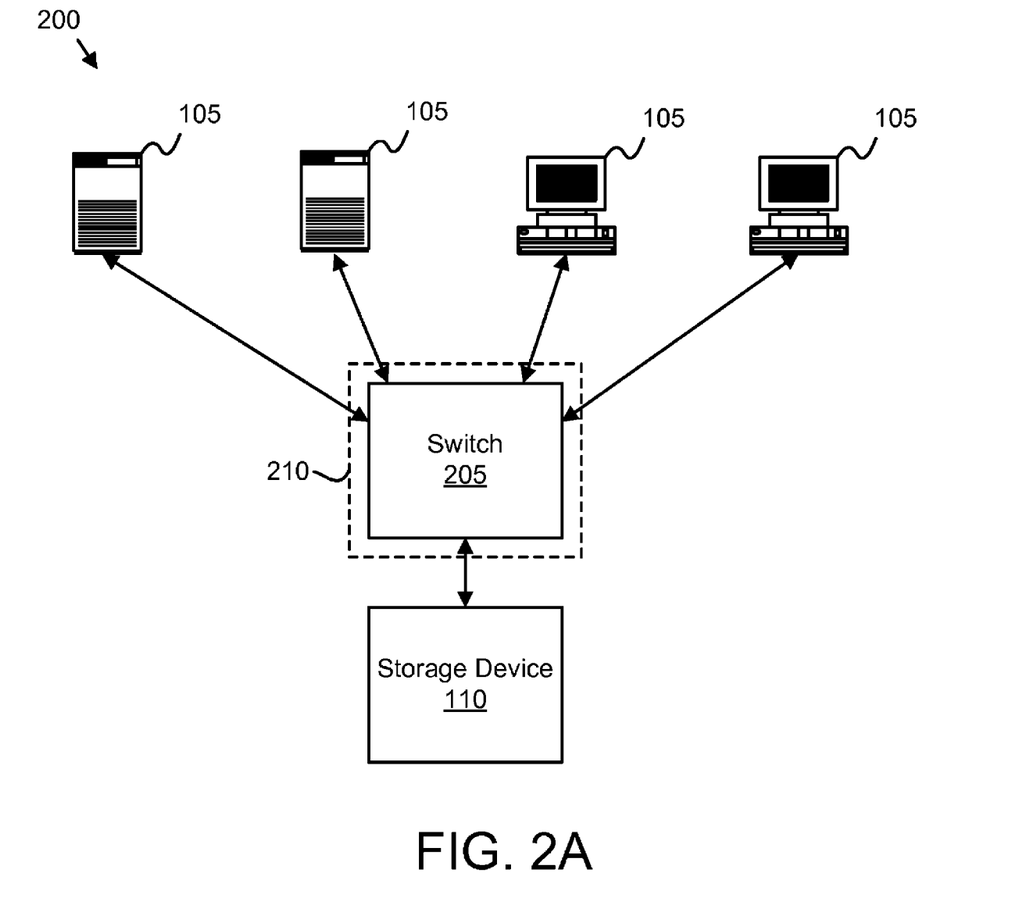
FIG. 2A is a schematic block diagram illustrating one embodiment of a storage area network (SAN) topology for connecting multiple hosts to a storage device via a switch fabric of the present invention.

FIG. 2A is a schematic block diagram illustrating one embodiment of a SAN topology 200 for connecting the hosts 105 to the storage device 110 via a switch fabric 210 of the present invention. The description of the SAN topology 200 refers to elements of FIG. 1, like numbers referring to like elements. The SAN topology 200 includes the hosts 105, the storage device 110, and a switch fabric 210. The switch fabric 210 may include one or more switches 205. Although, for simplicity only four (4) hosts 105, one (1) storage device 110, one (1) switch fabric 210, and one (1) switch 205 are shown, any number of hosts 105, storage devices 110, fabrics 210 and switches 205 may be used in the SAN topology 200. The SAN topology 200 may be compatible with many heterogeneous host environments such as UNIX®, HP-UX®, SOLARIS®, LINUX®, WINDOWS®, AIX®, or the like.

The switch 205 may include one or more semiconductor devices that may provide a topology of connections between the hosts 105 and the storage device 110. The switch fabric 210 may be a computer network topology that may connect the multiple hosts 105, the storage device 110, and high speed interconnects such as Fiber Channel and/or IB. For example, the switch fabric 210 may comprise the network of Fiber Channel switches and may allow connection of up to the theoretical maximum of sixteen million devices, limited only by the available address space of $2^{24}$ bits.

The SAN topology 200 may use small computer system interface (SCSI) protocols for communication between the hosts 105 and the storage device 110. The SCSI may be a set of standards for physically connecting and transferring the data between the multiple hosts 105 and the storage devices 110. The SCSI standards may define commands, protocols, and electrical and optical interfaces. For example, the SAN topology 200 may use Fiber Channels capable of transferring data at a rate of one to eight gigabit/sec (1-8 Gb/s), internet small computer system interface (iSCSI) for mapping SCSI over Transmission Control Protocol/IP (TCP/IP), Hyper SCSI for mapping SCSI over Ethernet, IB for mapping SCSI over IB and/or mapping TCP/IP over IB, or the like for transferring the data from the multiple hosts 105 to the storage devices 110.

The SAN topology 200 may be a Fiber Channel networking with the SCSI command set. The switch fabric 210 may comprise one or more switches 205. The switch 205 may be a network switch, packet switch or the like. The switch 205 may also be a non-blocking data link layer networking device. The switch 205 may perform non-blocking transparent bridging i.e. connection of multiple network segments with forwarding based on MAC addresses. Typical port speeds on an Ethernet switch may be ten to ten thousand megabits per second (10-10000 Mb/s), and half or full-duplex. Half-duplex may mean that the device can only send or receive the data at any given time, whereas full-duplex may mean that the device can send and receive the data at the same time.

For example, the SAN topology 200 may be a Fibre channel topology comprising one or more Fiber Channel switches 205. The Fibre Channel switches 205 may be a computer storage device and may allow creation of the switch fabric 210 in the form of a Fiber Channel Fabric. The switch fabric 210 in the form of the Fibre Channel Fabric 210 may be a network of Fiber Channel devices that may allow many-to-many communication. The switch fabric 210 in the form of a Fiber Channel fabric may be divided into zones to control access and/or storage of the data from or to the storage device 110.

The SAN topology 200 in the form of the Fiber Channel topology may be a point-to-point topology and may require switches 205 to connect one host 105 with one storage device 110. The Fiber Channel topology may also be Fibre Channel Arbitrated Loop (FC-AL) topology and that may not require switches 205 to connect one host 105 with one storage device 110. The FC-AL topology may handle one hundred twenty-six (126) multiple hosts 105 and one (1) storage device 110 per port. The bandwidth on the FC-AL topology may be shared among each host of the multiple hosts 105 and the storage device 110. The FC-AL topology may uses a NL port. The Fibre Channel topology may also be Fiber Channel-Switched Fabric (FC-SW) in which the hosts 105 and the storage device 110 may be connected to the Fiber Channel switches 205. The Fibre Channel switches 205 may manage the state of the switch fabric 210 and may provide optimized interconnections.

The SAN 200 may also utilize the FC-AL protocol for communication between the hosts 105 and the storage device 110 and may communicate or connect the hosts 105 and the storage device 110 via optical fibers. The optical fibers may provide high bandwidth for communication between the hosts 105 and the storage device 110. For example, the hosts 105 and the storage device 110 may link via two unidirectional fibers. The optical fibers may transmit signals in opposite directions with their associated transmitter and receiver. Each optical fiber may be attached to the transmitter of the port at one end and the receiver of another port at the other end.

The switch fabric 210 may use one or more Multi-Protocol Label Switching (MPLS), Label Distribution Protocol (LDP), Resource Reservation Protocol-Traffic Extension (RSVP-TE), Multi-Protocol extensions of Border Gateway Protocol (MP-BGP) labels, Multi-Protocol Label Switching (MPLS) to create Virtual Private Networks (VPNs), or the like for communication between the hosts 105 and the storage device 110. In a particular example, the SAN topology 200 may use the MPLS as data-carrying mechanism to transfer the data between the hosts 105 and the storage devices 110.

The hosts 105 may send the communication protocol in the form of SCSI command protocol to the storage device 110. On receiving the communication protocol, the storage device 110 may respond. The hosts 105 may send the SCSI commands to the storage device 110 in a Command Descriptor Block (CDB). The CDB may consist of one (1) byte operation code followed by five (5) or more bytes containing command-specific parameters. At the end of the command sequence the storage device 110 returns a Status Code byte.

The Status Code byte may be 00h for a success, 02h for an error or a Check Condition, or 08h for busy status. There may be four (4) categories of SCSI commands such as N (non-data), W (writing data from the host 105 to the storage device 110), R (reading data), and B (bidirectional). The most common types of the SCSI commands include a Test Unit ready command to ask the storage device 110, if it is ready for the data transfers i.e. the disk spun up and OS loaded, Request Sense to give any error codes from the previous command that returned an error status, SCSI Send diagnostic and Receive diagnostic results to run a simple self-test, or a specialized test defined in a diagnostic page, Start/Stop unit to spin disks up and down, load/unload media, SCSI Read Capacity command to return storage capacity, SCSI Format Unit command, SCSI Read command, SCSI Write command, SCSI LOG sense command to return current information from SCSI log pages, SCSI Mode Sense command to return current device parameters from SCSI mode pages, SCSI Mode select command to set storage device 110 parameters in a mode page, and the like.

Alternatively, the SAN topology 200 may utilize IB architecture for communication between the hosts 105 and the storage device 110. The 105 may connect to the switch fabric 210 in the form of IB fabric via a fabric interface adapter host also known as host channel adapter. The storage device 110 may connect to the switch fabric 210 in the form of IB fabric by a target channel adapter. The host channel adapter and the target channel adapter may be the like and may connect the hosts 105 and the storage device 110 in a manner known to those skilled in the art. The switch fabric 210 may enable the hosts 105 to access the storage device 110 by inducing communication between the storage device 110 and the hosts 105.

Figure 2B:
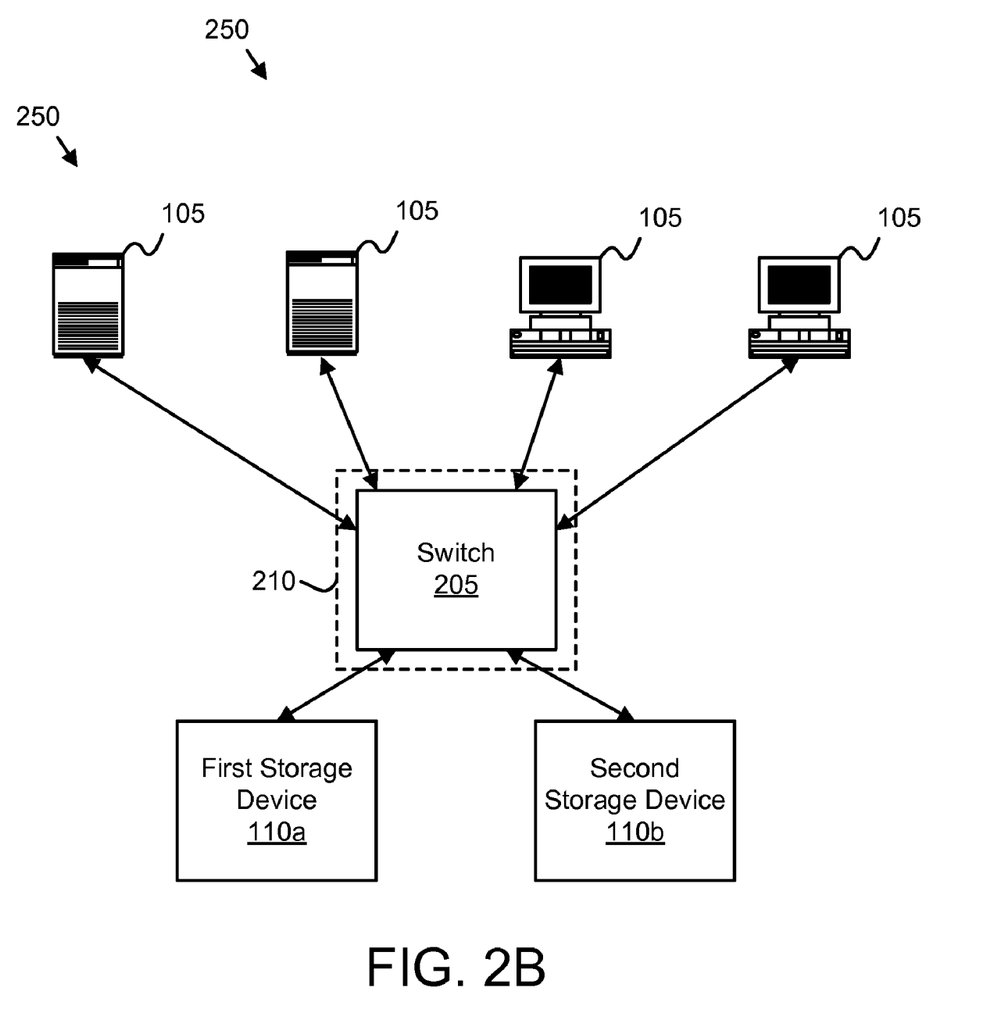
FIG. 2B is a schematic block diagram illustrating one embodiment of a SAN topology for connecting multiple hosts to two storage devices via a switch fabric of the present invention.

FIG. 2B is a schematic block diagram illustrating one embodiment of a SAN topology for connecting the hosts 105 to two (2) storage devices 110 through a switch fabric 210 of the present invention. The description of the SAN topology 250 refers to elements of FIGS. 1 and 2A, like numbers referring to like elements. The SAN topology 250 for may include one or more additional storage devices 110. The additional storage device 110 is herein described as the second storage device 110b. Although the SAN topology 250 is shown comprising one (1) SAN topology 200 and one (1) second storage device 110b, any number of those may be used in the SAN topology 250.

The first and second storage devices 110a-b may store data for the plurality of the hosts 105. The storage devices 110a-b may also each support five hundred (500) or more concurrent communication connections with the hosts 105 over the network 115. Each host 105 may communicate concurrently and/or serially with the storage devices 110 over the network 115 to store or access the data.

Figure 3:
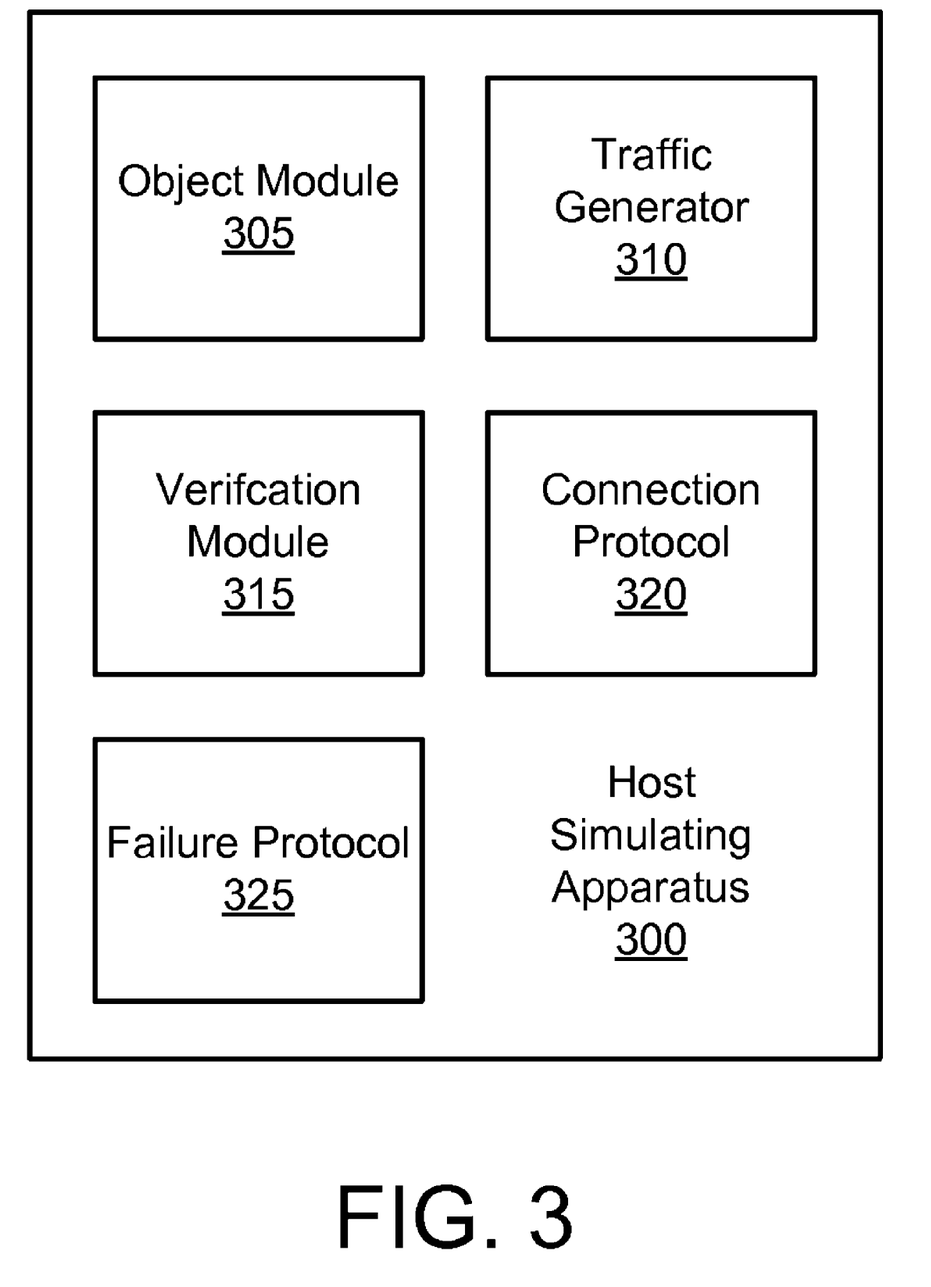
FIG. 3 is a schematic block diagram illustrating one embodiment of a host simulating apparatus of the present invention.

FIG. 3 is a schematic block diagram illustrating one embodiment of a host simulating apparatus 300 of the present invention. The description of the apparatus 300 refers to elements of FIGS. 1, 2A, and 2B, like numbers referring to like elements. The apparatus 300 includes an object module 305, a traffic generator 310, a verification module 315, a connection protocol 320, and a failure protocol 325.

The object module 305 creates a plurality of host object instances. The plurality of host object instances take the place of the hosts 105 in communicating with the storage device 110. For example, the object module 305 may create one (1) host object instance in place of one (1) host 105. A computer program product comprising a computer useable medium having a computer readable program may include the object module 305. The object module 305 comprising a computer program product may be stored on a first tangible storage media such as random access memory (RAM) and may be executed by a first processor.

In addition, each host object instance includes a unique identifier. The unique identifier may be a textual token in the form of a symbol that name language entities. Some of the kinds of the entities the unique identifier may include variables, types, labels, subroutines, and packages. The object module 305 may create the host object instances by the methods known to those skilled in the art. For example, the object module 305 may create the first host object instance by initializing memory addresses storing data including the unique identifier. The unique identifier may be in the form of the token "100+number_of (host)".

In an embodiment, the unique identifier is a World Wide Port Name (WWPN). For example, the object module 305 may create the fourth host object instance that may include the identifier WWPN5005076801492731.

Each host object instance simulates a host 105 to a storage device connection. The storage device connection may interface between each host 105 and the storage device 110 through one or more switches 205 of the switch fabric 210. For example, the third host object instance may automatically simulate the third host of the multiple hosts 105 to the storage device connection through the switch 205 of the switch fabric 210.

The traffic generator 310 serially establishes communications between each host object instance and the storage device 110 using the unique identifier until a number of host object instances in communication with the storage device 110 is greater than a host threshold. The host threshold may be the number of hosts 105 that may be supported by the storage device 110. The computer program product comprising the computer useable medium having the computer readable program may embody the traffic generator 310. The computer readable program product may be stored on a second tangible storage media and may be executed by a second processor. The traffic generator 310 may also include the switch 205 of FIGS. 2A and 2B.

The traffic generator 310 may establish communications between each host object instance and the storage device 110 in any order. For example, the traffic generator 310 may establish communications between first host object instance and the storage device 110 in an order starting from the unique identifier "100+number_of (host)". In another example, the traffic generator 310 may establish communications between fourth host object instance and the storage device 110 in an order starting from the WWPN 5005076801492749.

The verification module 315 verifies that the storage device 110 established communications with each host object instance according to a specified connection protocol 320. The connection protocol 320 may be a communication protocol such as a SCSI command, TCP/IP command and the like. The computer program product comprising the computer useable medium having the computer readable program may include the verification module 315. The verification module 315 comprising the computer program product may be stored on the first tangible storage media and may be executed by the first processor.

In an embodiment, the specified connection protocol 320 specifies criteria for verifying that each host object instance successfully logs in to the storage device 110 and performs data storage tasks. The verification module 315 communicates a pass if each host object instance communication is verified. For example, if the specified connection protocol 320 specifies verifying that first host object instance successfully logs in to the storage device 110 and performs data storage tasks, the verification module 315 may automatically communicate the pass.

The verification module 315 may further communicate a failure report if the storage device 110 fails to establish communications with each host object instance according to the specified connection protocol 320. For example, if the storage device 110 fails to establish communications with the fourth host object instance according to the specified connection protocol 320, the verification module 315 may automatically communicate the failure report.

In an embodiment, the traffic generator 310 is further configured to serially remove communications between each host object instance and the storage device 110. For example, the traffic generator 310 may serially remove communications between each host object instance and the storage device 110 starting from the last host object instance to the first host object instance.

The verification module 315 may be configured to verify that the storage device 110 removed communications with each host object instance according to the specified connection protocol 320 and communicates a failure report if the storage device 110 fails to remove communications with each host object instance according to the specified failure protocol 325. For example, the verification module 315 may verify that the storage device 110 removed communications with the third host object instance according to the specified connection protocol 320 and may communicate the failure report if the storage device 110 fails to remove communications with the third host object instance according to the specified failure protocol 325.

Figure 4:
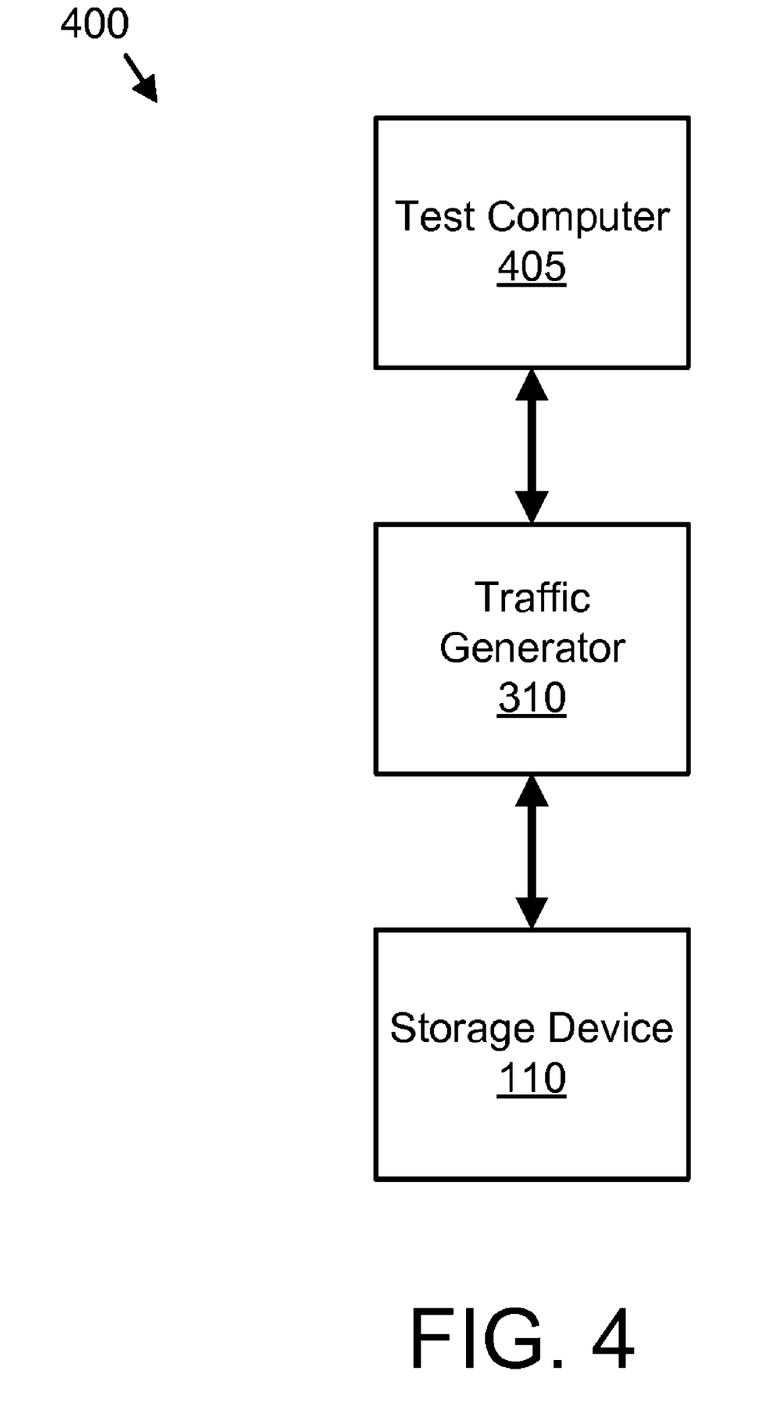
FIG. 4 is a schematic block diagram illustrating one embodiment of a system for simulating multiple hosts of the present invention.

FIG. 4 is a schematic block diagram illustrating one embodiment of a system 400 for simulating multiple hosts of the present invention. The description of the system 400 refers to elements of FIGS. 1, 2A, 2B, and 3, like numbers referring to like elements. The system 400 of FIG. 4 may embody the apparatus 300. The system 400 includes a test computer 405, a traffic generator 310 and a storage device 110. Although, for simplicity only one (1) test computer 405, one (1) traffic generator 310 and one (1) storage device 110 are shown, any number of test computers 405, traffic generators 310 and storage devices 110 may be used in the system 400.

The test computer 405 may be a computer workstation, server, mainframe computer, and the like known to those skilled in the art. The test computer 405 comprises the object module 305. The object module 305 is configured to create a plurality of host object instances. Each host object instance is configured to simulate the host 105 to the storage device connection of the storage device 110. Each host object instance includes the unique identifier.

The test computer 405 further comprises the verification module 315. The verification module 315 is configured to verify that the storage device 110 established communications with each host object instance according to the specified connection protocol. The verification module 315 further communicates the pass if each host object instance communication is verified.

The traffic generator 310 comprises interface hardware and semiconductor logic. In an embodiment, the interface hardware is configured as a Fibre Channel interface. The Fibre Channel interface may include the switch fabric 210. The switch fabric 210 may comprise one or more Fibre Channel switches 205. The switch fabric 210 may be configured as one or more semiconductor devices those may provide connections between the test computer 405 and the storage devices 110 in the SAN topologies 200, 250. The traffic generator 310 serially establishes communications between each host object instance and the storage device 110 using the unique identifier until a number of host object instances in communication with the storage device is greater than a host threshold. For example, the traffic generator 310 in the form of the switch fabric 210 may serially establish communications between each host object instance and a storage device 110 using the unique identifier such as the WWPN until a number of host object instances in communication with the storage device 110 is greater than the host threshold. The host threshold may be equal to or greater than the actual number of the hosts 105 in the SAN topologies 200, 250.

Alternatively, the interface hardware may be configured as a non-blocking switch 205. The traffic generator 310 in the form of the non-blocking switch 205 may serially establish communications between each host object instance and a storage device 110 using the unique identifier such as the WWPN until the number of host object instances in communication with the storage device 110 is greater than the hosts 105 in the SAN topologies 200, 250.

The storage device 110 may consist of a number of logical blocks. Each logical block may be recognized through a Logical Block Addresses (LBA). Each LBA may refer the logical blocks of the storage device 110. For example, the SCSI Read (6) and Write (6) commands may contain a twenty-one (21) bit LBA.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and the symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
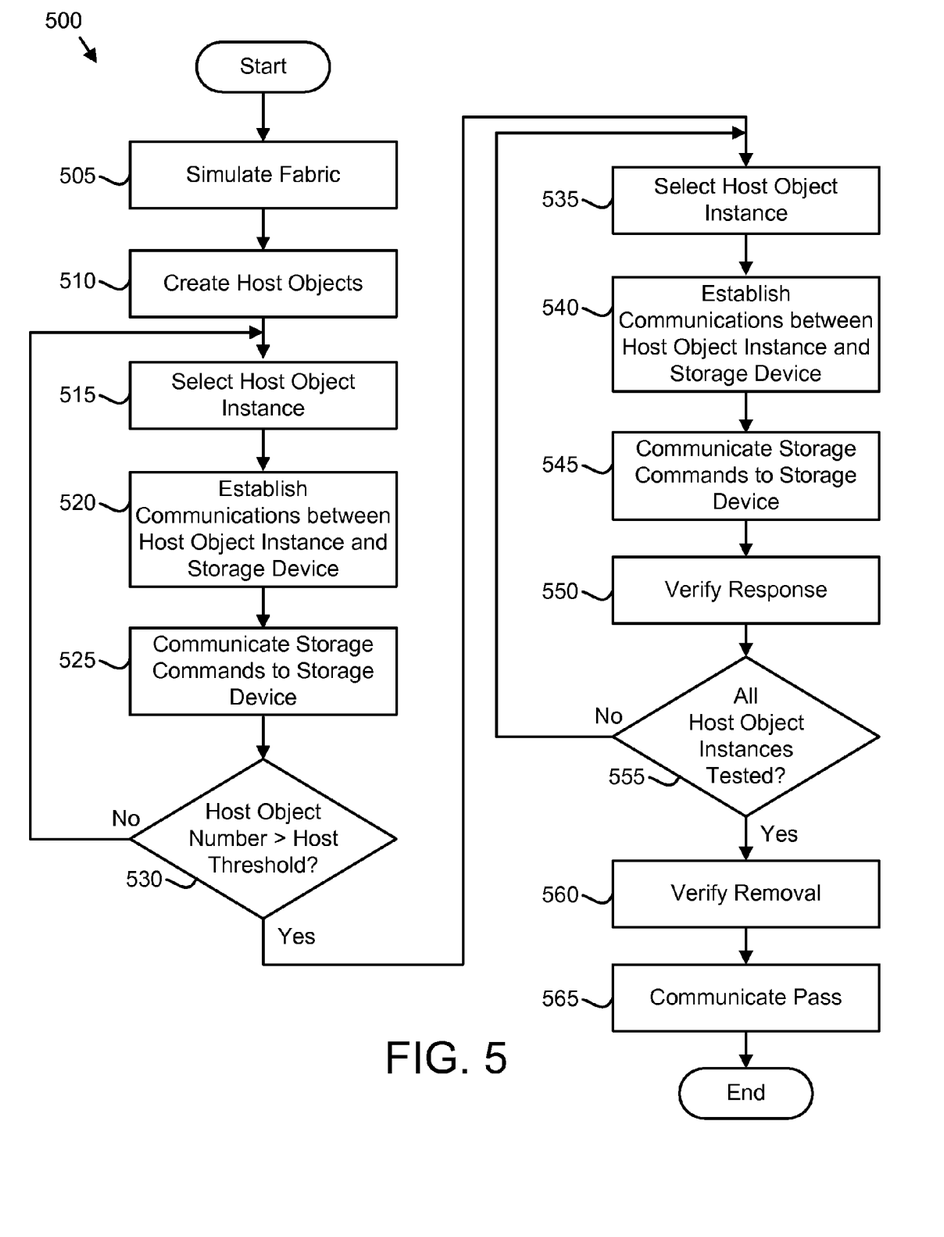
FIG. 5 is a schematic flow chart diagram illustrating one embodiment of a multiple hosts simulating method of the present invention.

FIG. 5 is a schematic flow chart diagram illustrating one embodiment of a multiple hosts simulating method 500 of the present invention. The method 500 substantially includes the steps to carry out the functions presented above with respect to the operation of the described SAN topologies, apparatus, and system of FIGS. 1-4. The description of the method 500 refers to elements of FIGS. 1-4, like numbers referring to like elements. In one embodiment, the method 500 is implemented with a computer program product comprising a computer readable medium having a computer readable program. The computer readable program may be integrated into the test computer 405, wherein the program in combination with the test computer and the traffic generator 310 is capable of performing the method 500.

The method 500 starts and in one embodiment, the test computer 405 may simulate 505 a communications network fabric. The communications network fabric may be the switch fabric 210 of the SAN topologies 200, 250. For example, the test computer 405 may simulate 505 the communications network fabric on completion of a boot of the test computer 405. During the process of booting the test computer 405, the storage device 110 may complete a switch fabric login to simulate 505 the communications network fabric.

The test computer 405 may communicate with the storage device 110 through the switch 205. The switch 205 may be the switch 205 of the SAN topologies 200, 250. Alternatively, in an embodiment, the test computer 405 communicates with the storage device 110 through a loop topology. The loop topology may be the FC-AL topology of the SAN topologies 200, 250.

In an embodiment, the object module 305 creates 510 the plurality of host object instances, wherein each host object instance includes the unique identifier. In a certain embodiment, the unique identifier is the WWPN. For example, the object module 305 may automatically initiate a SCSI Loop Initialization protocol through a plurality of FC-AL initiators by running a Basic Input/Output Services (BIOS) program to create 510 the unique identifiers. Each SCSI port may support one hundred twenty six (126) hosts 105 and one (1) storage device 110. In an embodiment, the communications network fabric may connect the host object instances to the storage device 110.

The created host object instances may serially be numbered. For example, the created first host object instance may be assigned number zero (0), the second host object instance may be assigned number one (1) and so on. The created host object instances may be displayed in the form of graphical user interfaces (GUIs) such as a plurality of icons or the like on a display of the test computer 405.

Each host object instance is configured to simulate the host 105 to the storage device connection of the storage device 110. For example, the nth host object instance in the form of the WWPN 5005076801492750 may simulate the (n−1)th host 105 to the storage device connection of the storage device 110.

The test computer 405 may automatically select 515 one (1) host object instance of the plurality of host object instances arbitrarily. For example, the test computer 405 may automatically initially select 515 the nth host object instance in the form of WWPN 5005076801492750.

Alternatively, an administrator may arbitrarily select 515 one (1) host object instance of the plurality of host object instances by clicking the icon representing the particular host object instance. For example, the administrator may initially select 515 by clicking the icon for nth host object instance in the form of WWPN 5005076801492750.

The traffic generator 310 establishes 520 communications between the selected host object instance and the storage device 110. The established communications may be bi-directional. The communications may be through the Fibre Channel interface. Alternatively, the communications may be through the non-blocking switch 205. The non-blocking switch 205 may provide non-blocking transparent bridging i.e. connection of multiple network segments with forwarding based on the selected host object instance in the form of the WWPN. For example, the traffic generator 310 comprising as the non-blocking switch 205 may automatically establish 520 communications between the selected nth host object instance and the storage device 110.

The traffic generator 310 may communicate 525 a plurality of storage commands from the selected host object instance to the storage device 110. The plurality of storage commands may be as per the SCSI storage command protocol. For example, the traffic generator 310 may communicate 525 the storage commands such as SCSI W and/or SCSI R from the selected nth host object instance to the storage device 110.

Further, the traffic generator 310 may determine 530 that the number of selected host object instance is greater than the host threshold. The host threshold may be equal to the number of hosts 105 those may be supported by the storage device 110. For example, if the storage device 110 of the SAN topologies 200, 250 support six hundred (600) real and/or logical hosts 105, the host threshold for the SAN topologies 200, 250 may be six hundred (600). Continuing with the example, the traffic generator 310 may determine 530 that the selected nth host object instance is greater than six hundred (600) storage commands.

If the traffic generator 310 determines 530 that the number of the selected host object instance is less than or equal to the host threshold, the method 500 may loop to the step 515. If the traffic generator 310 determines 530 that the number of the selected host object instance is greater than the host threshold, the test computer 405 may automatically select 535 another host object instance of the plurality of the host object instances. For example, if the traffic generator 310 determines 530 that the number of the selected host object instance number is greater than six hundred (600), the test computer 405 may automatically select 535 another host object instance the xth host object instance with a WWPN of 5005076801492650.

The traffic generator 310 establishes 540 communications between the selected host object instance and the storage device 110. For example, the traffic generator 310 may automatically establish 540 communications between the selected xth host object instance and the storage device 110.

The traffic generator 310 may communicate 545 the plurality of storage commands from the selected host object instance to the storage device 110. For example, the traffic generator 310 may communicate 545 the SCSI W and/or R storage commands in the CDB from of the selected xth host object instance to the storage device 110.

The verification module 315 may verify 550 the response. The response may be from the storage device 110 to the test computer 405. The response may be in the form of the return Status Code byte.

In an embodiment, the verification module 315 verifies 550 that the storage device 110 established communications with the selected host object instance according to the specified connection protocol. The specified connection protocol may specify verifying that the selected host object instance successfully logs in to the storage device 110 and performs data storage tasks. The data storage tasks may comprise reading the data and/or writing the data. For example, if the storage device 110 returns the response in the form of the return Status Code byte 00h, the verification module 315 may verify 550 that the selected xth host object instance logged in to the storage device 110 successfully and performed the data storage tasks successfully.

Alternatively, the verification module 315 may verify 550 that the storage device 110 could not establish communications with the selected host object instance according to the specified connection protocol. The specified connection protocol may specify verifying that the selected host object instance could not successfully log in to the storage device 110. For example, if the storage device 110 returns the response in the form of a return Status Code byte 02h or 08h, the verification module 315 may verify 550 that the selected xth host object instance could not successfully log in to the storage device 110 and could not perform the data storage tasks successfully.

The traffic generator 310 may further determine 555 that all the host object instances are tested. For example, the traffic generator 310 may determine 555 that the number of selected xth host object instance is zero (0) where zero (0) is the last host object instance.

If the traffic generator 310 determines 555 that all of the host object instances are not tested, the method 500 may loop to the step 535. If the traffic generator 310 determines 555 that all selected host object instances are tested, the verification module 315 verifies that the storage device 110 established communications with each host object instance according to the specified connection protocol, the verification module 315 may further communicate 565 the pass. For example, if the verification module 315 verifies 550 the response in the form of the Status Code byte 00h byte from the storage device 110 to the selected host object instance, the verification module 315 may communicate 565 the pass. The communication may be visible by flashing a message indicating the pass on the display and/or may be audible by automatically announcing the message indicating the pass through one or more speakers of the test computer 405.

In one embodiment, the verification module 315 verifies 560 that each host object instance is successfully removed from the storage device 110 as will be described in FIG. 6. The verification module 315 may further communicate 565 the failure report if the storage device 110 fails to establish communications with each host object instance according to the specified connection protocol. For example, if the verification module 315 verifies 555 the response by receiving the Status Code byte 02h byte or the Status Code byte 08h byte from the storage device 110, the verification module 315 may communicate 565 the failure report.

Figure 6:
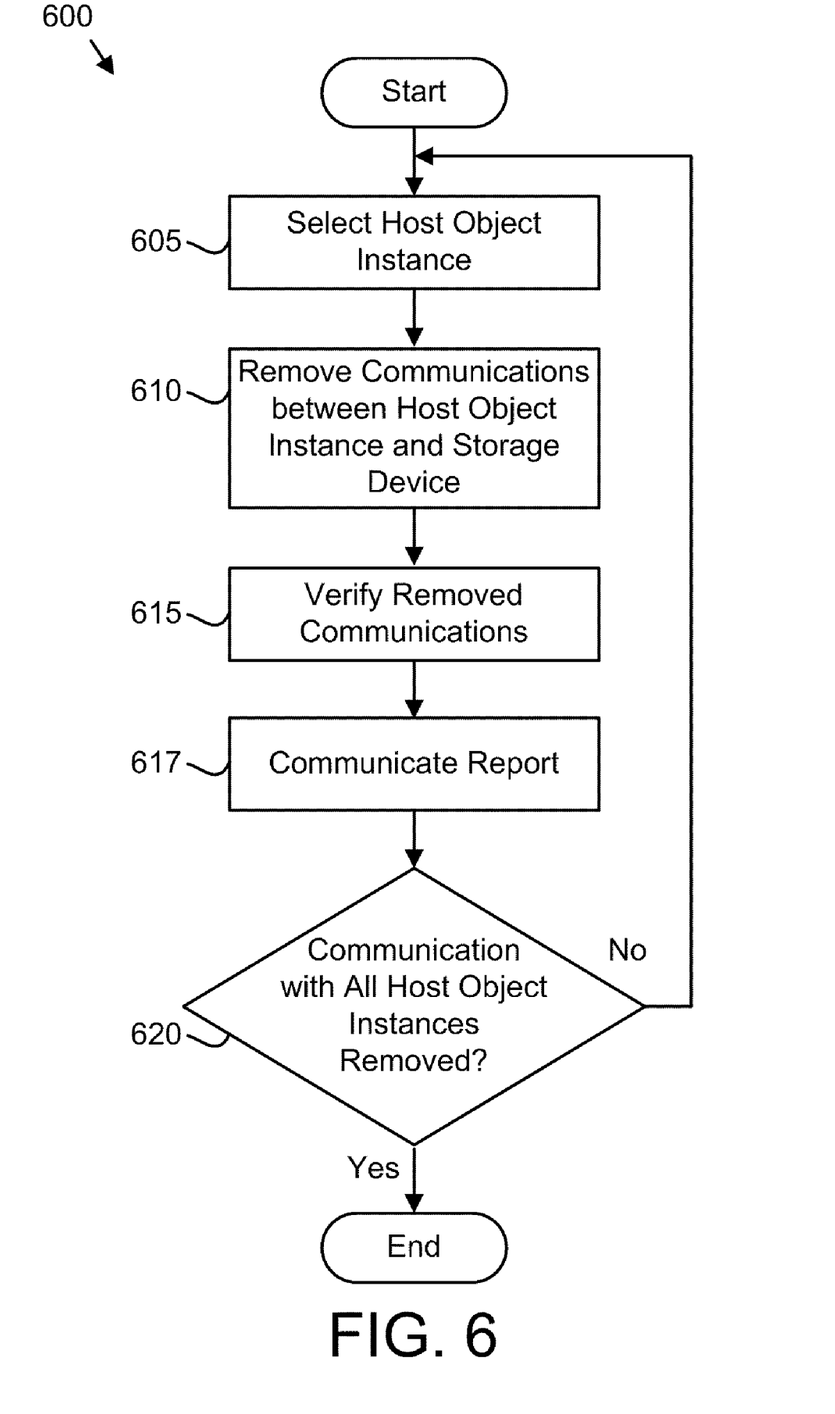
FIG. 6 is a schematic flow chart diagram illustrating one embodiment of a method for verifying removal of all hosts of the present invention.

FIG. 6 is a schematic flow chart diagram illustrating one embodiment of a method 600 for verifying removal of all hosts 105 of the present invention. The method 600 substantially includes the steps to carry out the functions presented above with respect to the operation of the described SAN topologies, apparatus, system, and method of FIGS. 1-5, particularly step 560 of FIG. 5. The description of the method 600 refers to elements of FIGS. 1-4, like numbers referring to like elements. In one embodiment, the method 600 is implemented with a computer program product comprising a computer readable medium having a computer readable program. The computer readable program may be integrated into the test computer 405, wherein the program in combination with the test computer and the traffic generator 310 is capable of performing the method 600.

The method 600 starts and in one embodiment, the administrator or the test computer 405 may select 605 the host object instance. One (1) host object instance may be selected initially. For example, the test computer 405 may initially select 605 the yth host object instance with the unique identifier of WWPN 5005076801493750.

The traffic generator 310 may serially remove 610 communications between the selected host object instance and the storage device 110. The verification module 315 may verify 615 that the storage device 110 removed communications with the selected host object instance.

The verification module 315 may communicate 617 a failure report if the storage device fails to remove communications with each host object instance according to the specified failure protocol 325. The specified failure protocol 325 may specify verifying that each host object instance successfully logs out from the storage device 110 and does not perform data storage tasks.

The verification module 315 may further determine 620 that communications with all the hosts 105 are removed. For example, the verification module 315 may automatically determine 620 that the storage device 110 does not communicate with any host object instances. In a particular example, the verification module 315 may automatically determine 620 that the last selected zth host object instance does not communicate with any host object instances.

Thus, the methods 500, 600 simulate multiple hosts 110 supported by the storage device 110 of the SAN topologies 200, 250 by creating the plurality of host object instances, serially establishing communications between each host object instance and a storage device 110 and verifying that the storage device established communications with each host object instance according to a specified connection protocol. The present invention verifies boundary limits for the multiple hosts 105 while testing the storage device 110. The present invention simulates multiple hosts 105. Beneficially, the present invention would test support of a storage device for the multiple hosts. Additionally, the present invention may allow the administrator to verify the capability of the storage device 110 to connect the maximum number of hosts 105 by simulating the communications between the host object instances and the storage device 110.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable storage medium storing a computer readable program, wherein the computer readable program when executed on a computer causes the computer to:
   create a plurality of host object instances each configured to simulate a host to a storage device connection, wherein each host object instance includes a unique identifier;
   serially establish communications between each host object instance and a storage device using the unique identifier until a number of host object instances in communication with the storage device is greater than a host threshold, wherein the host threshold is a number of hosts supported by the storage device;
   verify that the storage device established communications with each host object instance according to a specified connection protocol; and
   communicate a pass if each host object instance communication is verified.

2. The computer program product of claim 1, wherein the computer readable program is further configured to cause the computer to communicate a failure report if the storage device fails to establish communications with each host object instance according to the specified connection protocol.

3. The computer program product of claim 1, wherein the computer readable program is further configured to cause the computer to:
   serially remove communications between each host object instance and the storage device;
   verify that the storage device removed communications with each host object instance according to the specified connection protocol.

4. The computer program product of claim 3, wherein the computer readable program is further configured to cause the computer to communicate a failure report if the storage device fails to remove communications with each host object instance according to a specified failure protocol.

5. The computer program product of claim 1, wherein the unique identifier is a World Wide Port Name.

6. The computer program product of claim 1, wherein the specified connection protocol specifies verifying that each host object instance successfully logs into the storage device and performs data storage tasks.

7. The computer program product of claim 6, wherein the data storage tasks comprise reading data and writing data.

8. The computer program product of claim 1, wherein the specified connection protocol directs the computer readable program to cause the computer to reject communications with an over threshold host object instance.

9. The computer program product of claim 1, wherein the computer readable program is further configured to cause the computer to simulate a communications network fabric that connects the host object instances to the storage device.

10. The computer program product of claim 1, wherein the computer communicates with the storage device through a switch.

11. The computer program product of claim 1, wherein the computer communicates with the storage device through a loop topology.

12. An apparatus for simulating multiple hosts, the apparatus comprising:
- an object module comprising a computer readable program stored on a first tangible storage media, executed by a first processor, and configured to create a plurality of host object instances each configured to simulate a host to a storage device connection, wherein each host object instance includes a unique identifier;
- a traffic generator comprising a computer readable program stored on a second tangible storage media, executed by a second processor, and configured to serially establish communications between each host object instance and a storage device using the unique identifier until a number of host object instances in communication with the storage device is greater than a host threshold, wherein the host threshold is a number of hosts supported by the storage device; and
- a verification module comprising a computer readable program stored on the first tangible storage media, executed by the first processor, and configured to verify that the storage device established communications with each host object instance according to a specified connection protocol and communicate a pass if each host object instance communication is verified.

13. The apparatus of claim 12, wherein the verification module is further configured to communicate a failure report if the storage device fails to establish communications with each host object instance according to the specified connection protocol.

14. The apparatus of claim 12, wherein:
- the traffic generator is further configured to serially remove communications between each host object instance and the storage device; and
- the verification module is configured to verify that the storage device removed communications with each host object instance according to the specified connection protocol and communicate a failure report if the storage device fails to remove communications with each host object instance according to attic specified failure protocol.

15. The apparatus of claim 12, wherein the unique identifier is a World Wide Port Name.

16. The apparatus of claim 12, wherein the specified connection protocol specifies verifying that each host object instance successfully logs in to the storage device and performs data storage tasks.

17. A system for simulating multiple hosts, the system comprising:
- a storage device;
- a test computer comprising an object module configured to create a plurality of host object instances each configured to simulate a host to a storage device connection of the storage device, wherein each host object instance includes a unique identifier;
- a traffic generator comprising interface hardware and semiconductor logic and configured to serially establish communications between each host object instance and the storage device using the unique identifier until a number of host object instances in communication with the storage device is greater than a host threshold, wherein the host threshold is a number of hosts supported by the storage device; and
- the test computer further comprising a verification module configured to verify that the storage device established communications with each host object instance according to a specified connection protocol and communicate a pass if each host object instance communication is verified.

18. The system of claim 17, wherein the interface hardware is configured as a Fiber Channel interface.

19. The system of claim 17, wherein the interface hardware is configured as a non-blocking switch.

20. A method for deploying computer infrastructure, comprising integrating computer readable program into a computing system, wherein the program in combination with the computing system is capable of performing the following:
- creating a plurality of host object instances each configured to simulate a host to a storage device connection, wherein each host object instance includes a unique identifier;
- serially establishing communications between each host object instance and a storage device using the unique identifier until a number of host object instances in communication with the storage device is greater than a host threshold, wherein the host threshold is a number of hosts supported by the storage device;
- verifying that the storage device established communications with each host object instance according to a specified connection protocol;
- communicating a failure report if the storage device fails to establish communications with any host object instance according to the specified connection protocol;
- serially removing communications between each host object instance and the storage device;
- verifying that the storage device removed communications with each removed host object instance according to the specified connection protocol; and
- communicating a pass if each host object instance communication is verified.

* * * * *